Nov. 11, 1958  J. R. PECK  2,859,579
SELF-PROPELLED ROTARY MOWER HAVING IMPROVED DRIVE
Filed Nov. 29, 1957  4 Sheets-Sheet 1

INVENTOR.
JEAN R. PECK,
BY
McMorrow, Berman & Davidson
ATTORNEYS.

Nov. 11, 1958  J. R. PECK  2,859,579
SELF-PROPELLED ROTARY MOWER HAVING IMPROVED DRIVE
Filed Nov. 29, 1957  4 Sheets-Sheet 4

INVENTOR.
JEAN R. PECK,
BY
McMorrow, Berman & Davidson
ATTORNEYS.

United States Patent Office 2,859,579
Patented Nov. 11, 1958

2,859,579

SELF-PROPELLED ROTARY MOWER HAVING IMPROVED DRIVE

Jean R. Peck, Eaton, Ind.

Application November 29, 1957, Serial No. 699,585

3 Claims. (Cl. 56—25.4)

This invention relates generally to lawn mowers. More particularly, the invention has reference to a riding type lawn mower having a generally improved construction as compared to mowers of the same type previously devised.

The main object of the present invention is to provide a generally improved mower of the category referred to above. To this end, the invention, summarized briefly, comprises a novelly shaped, rugged frame, supporting a rider's seat and an internal combustion engine. A novel steering assembly is incorporated in the frame, which assembly includes a combination handle bar and tie rod, so designed as to simplify construction, facilitate turning of the machine, and permit said turning without interfering with the rider's position or causing any discomfort or inconvenience so far as the rider is concerned. The cutting blade assembly and its associated housing are carried by the frame, between the front, steerable wheels of the mower's steering assembly. A single, rear wheel is incorporated in the structure, and constitutes the drive wheel.

Extending from the prime mover to the drive wheel is a driving assembly including, over part of its length, a belt-and-pulley means, said driving assembly to the drive wheel including for the remainder of its length sprocket and chain means. The driving assembly includes, also, a driving linkage with the cutting blade, and incorporated in the driving assembly is a novel clutch arrangement particularly designed to facilitate swift and easy clutching and declutching, and further designed to connect the drive wheel with the prime mover for either forward or reverse movement of the machine, the clutch assembly being swiftly and easily controlled by operation of a foot bar conveniently disposed to be swung in selected directions by the feet of the supported rider.

Among specific objects of the invention are the following:

To provide an improved frame construction for a mower of the character stated;

To facilitate swift and easy adjustment of the pisition of the rider's seat upon the frame;

To facilitate the mounting of the driving assembly and the driving wheel upon the frame, in an arrangement calculated to reduce considerably the cost of manufacture of the device while at the same time promoting maintenance and repair;

To provide an improved double clutching assembly, that will be swiftly and easily controlled by the rider in a manner to disengage the prime mover from the drive wheel whenever desired, whether the mower is moving either forwardly or rearwardly; will be designed to engage the drive wheel with the prime mover for either forward or reverse movement of the drive wheel; and will be further designed to permit clutching and declutching without interference with the continuous, uni-directional driving of the cutter blade;

To provide an improved steering assembly, of particularly simplified design, wherein the tie rod becomes the handle bar of the steering assembly, thereby being given two functions with a view to simplifying manufacture while at the same time producing full maneuverability of the machine;

To particularly facilitate the mounting of the various driving linkages upon the frame in a position to swiftly and easily put the sprocket chains and belts under selected tension; and To provide a riding type, rotary mower of the tricycle type which will be of effectively stabilized design, will be safe in operation, and will have maximum versatility in relation to its overall cost.

Other objects will appear from the following description, the claims appended thereto, and from the annexed drawing, in which like reference characters designate like parts throughout the several views, and wherein:

Figure 1:
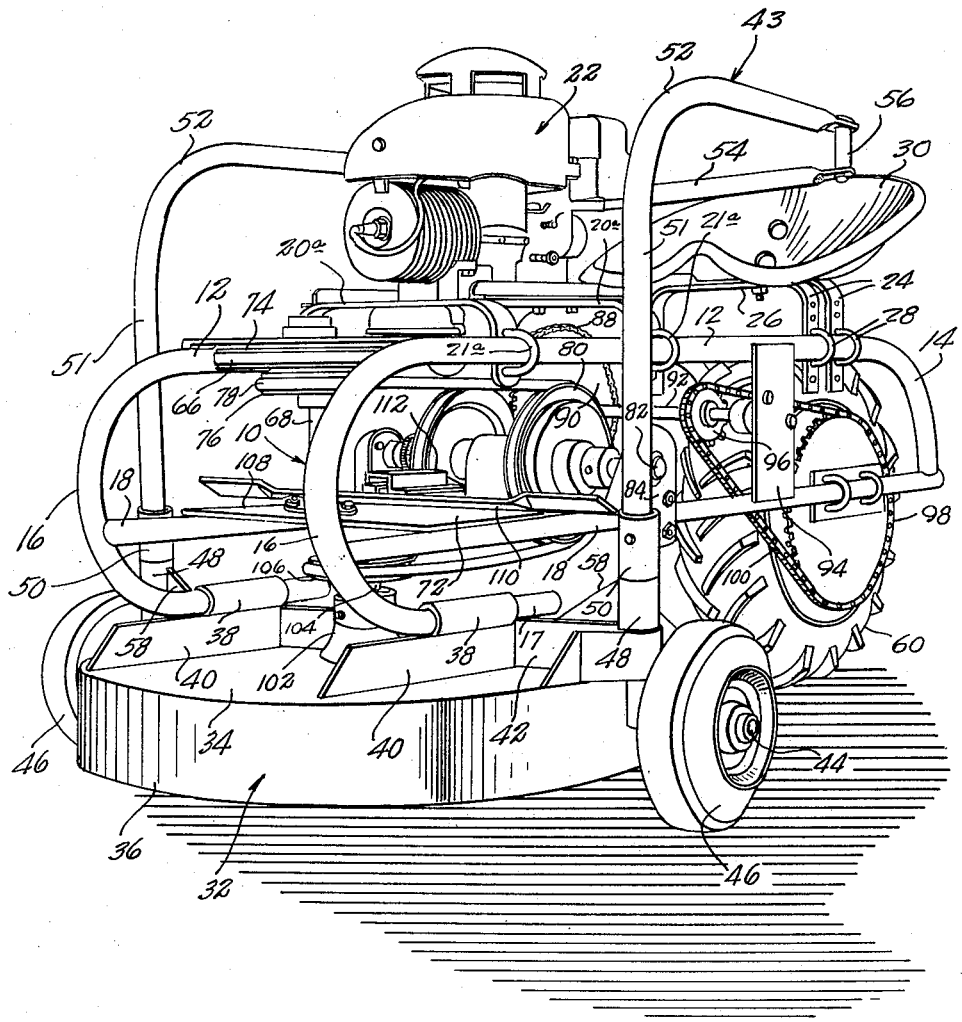
Figure 1 is a perspective view of a riding type mower formed in accordance with the present invention, as seen from the front.

Referring to the drawing in detail, designated generally at 10 is the support frame of the mower. This comprises a pair of identically formed, longitudinally extending, transversely spaced main frame members 12, which can be formed of tubular steel or other stock having the requisite strength and rigidity. At this point, it will be understood that the materials, dimensions, and other details can be varied, without departure from the spirit of the invention as hereinafter claimed, and accordingly materials will not be specified herein except where believed critical to successful operation of the invention.

Figure 2:
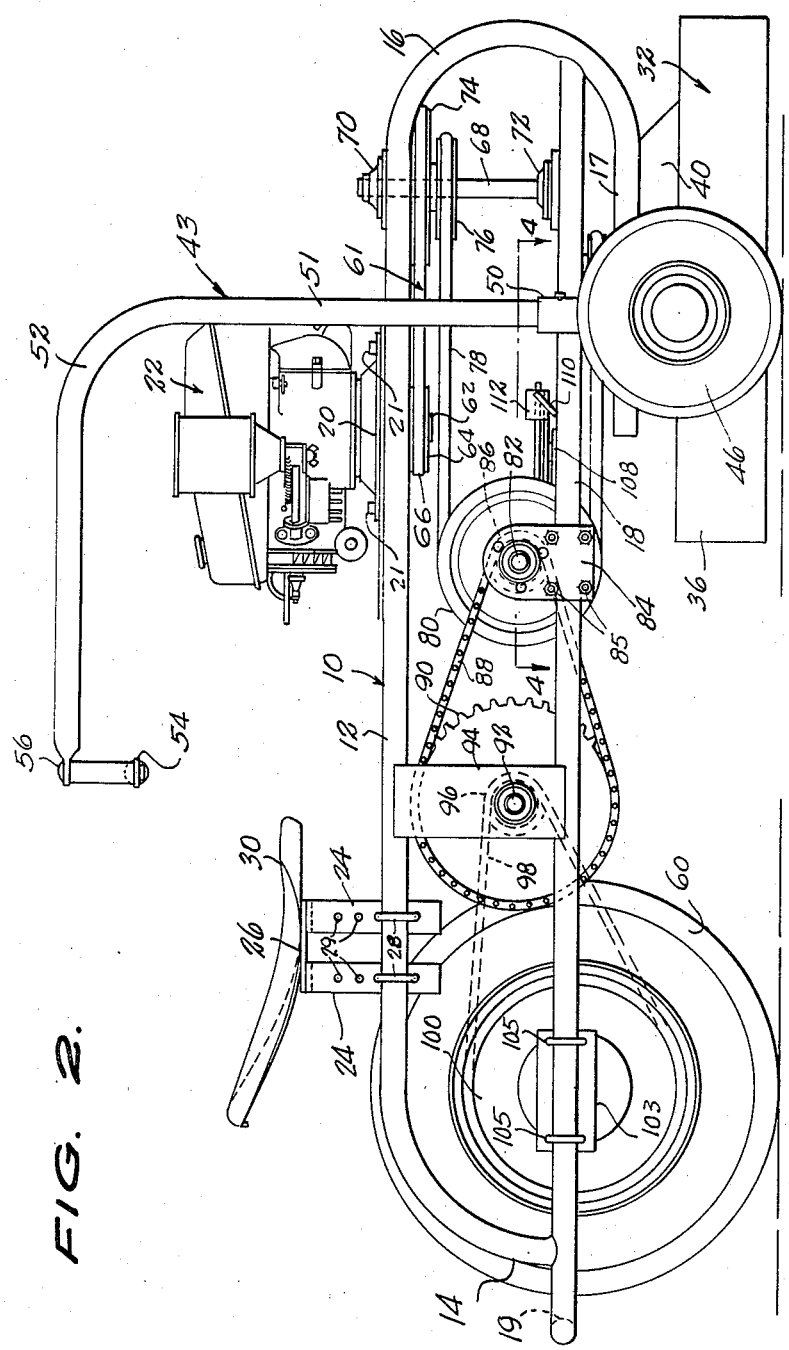
Figure 2 is an enlarged side elevational view of a modified form of mower.

In any event, the elongated, horizontal, intermediate portions of the main frame members 12 (see Figure 2) merge at their forward ends into downwardly and rearwardly extending front portions, while said intermediate portions at their rear ends merge into downwardly curving rear portions 14. The rear end portions 14 curve through 90°, more or less, as shown in Figure 2. The forward portions 16 curve through substantially 180°, merging at their lower ends into straight, rearwardly projecting, blade housing support members 17 disposed parallel to the straight intermediate portions of the side frame members.

Fixedly connected at their forward and rear ends to the forward end portions 16 and rear end portions 14 respectively are elongated, straight side rails 18 merging at their rear ends into a curved bight portion 19 (see Figure 3) which curves through substantially 180° in embracing relation to and rearwardly from the rear drive wheel, thus providing a rear bumper or guard.

This particular frame construction provides for exceptional strength and rigidity, while still providing full access to the various components of the invention to be described hereinafter.

A rectangular motor support plate 20 (Figure 3) has at its corners bolts 21 or their equivalents, whereby the motor support plate is fixedly secured to the respective side frame members 12, extending in a horizontal plane between said side frame members. Obviously, the type of connection employed can be varied as desired, it being mainly important that the motor support be fixedly supported upon the side frame members in position to effectively mount upon the frame an internal combustion motor 22 of suitable design and rating. For example, in Figures 2 and 3 the motor support plate is supported at its opposite sides directly upon the side frame members. In the form of the invention shown in Figure 1, however, motor support plates 20a are used, having depending extensions projecting downwardly in contact with the inner sides of the side frame members, said extensions receiving U-bolts 21a that embrace the side frame members.

In all other respects, the form of the invention shown in Figures 2-5 is identical to the form shown in Figure 1.

The arrangement illustrated and described has the desirable characteristic that the motor can be adjusted longitudinally of the frame, and secured fixedly to the frame in any position to which it is so adjusted. This permits not only swift and easy mounting of the motor, but also facilitates removal of the motor whenever it needs repair or replacement. Still further, the arrangement may even be employed for facilitating tensioning of belts of the drive assembly.

Spaced rearwardly along the frame from motor 22 are transversely disposed seat support brackets 24 of inverted U-shape (see Figures 1 and 2), to which is fixedly connected a support plate 26. U-bolts 28 extend through selected openings 29 of the brackets, to provide for height adjustment of a seat 30, said U-bolts receiving the side members, whereby to permit the seat to be adjusted toward or away from the motor along the frame.

Designated generally at 32 is the cutter assembly. This is disposed at the forward end of the machine, and includes a downwardly opening, generally circular blade housing 34 having a horizontal top plate rigid at its periphery with a depending guard flange or skirt 36 (see Figures 1 and 2). Within the housing there would be provided a cutter blade of conventional design, not shown, rotating in a horizontal plane to provide the usual, so-called "whirl cut" type of cutting action.

Referring to Figure 1, a pair of transversely spaced sleeves 38 are fixedly mounted upon correspondingly spaced reinforcing plates 40 rigid with the top plate of the blade housing. The sleeves and blades extend in a fore-and-aft direction, the plates being rigid at their rear ends with a transversely disposed cross member or bracing plate 42 (Figures 1 and 3).

Stub shafts 44 comprise part of a steering assembly generally designated 43. Rotatably mounted upon the stub shafts are relatively small diameter front wheels 46 which as shown in Figure 3 are steerable wheels, for guiding the mower during the cutting operations.

Vertically disposed bearing brackets or journals 48 are provided upon opposite sides of the mower housing, and abutting said brackets are adjustable collars 50 mounted upon vertically disposed shafts or steering bars 51. This is only one arrangement of a construction for rotatably mounting the shafts 51 upon opposite sides of the blade housing.

Figure 3:
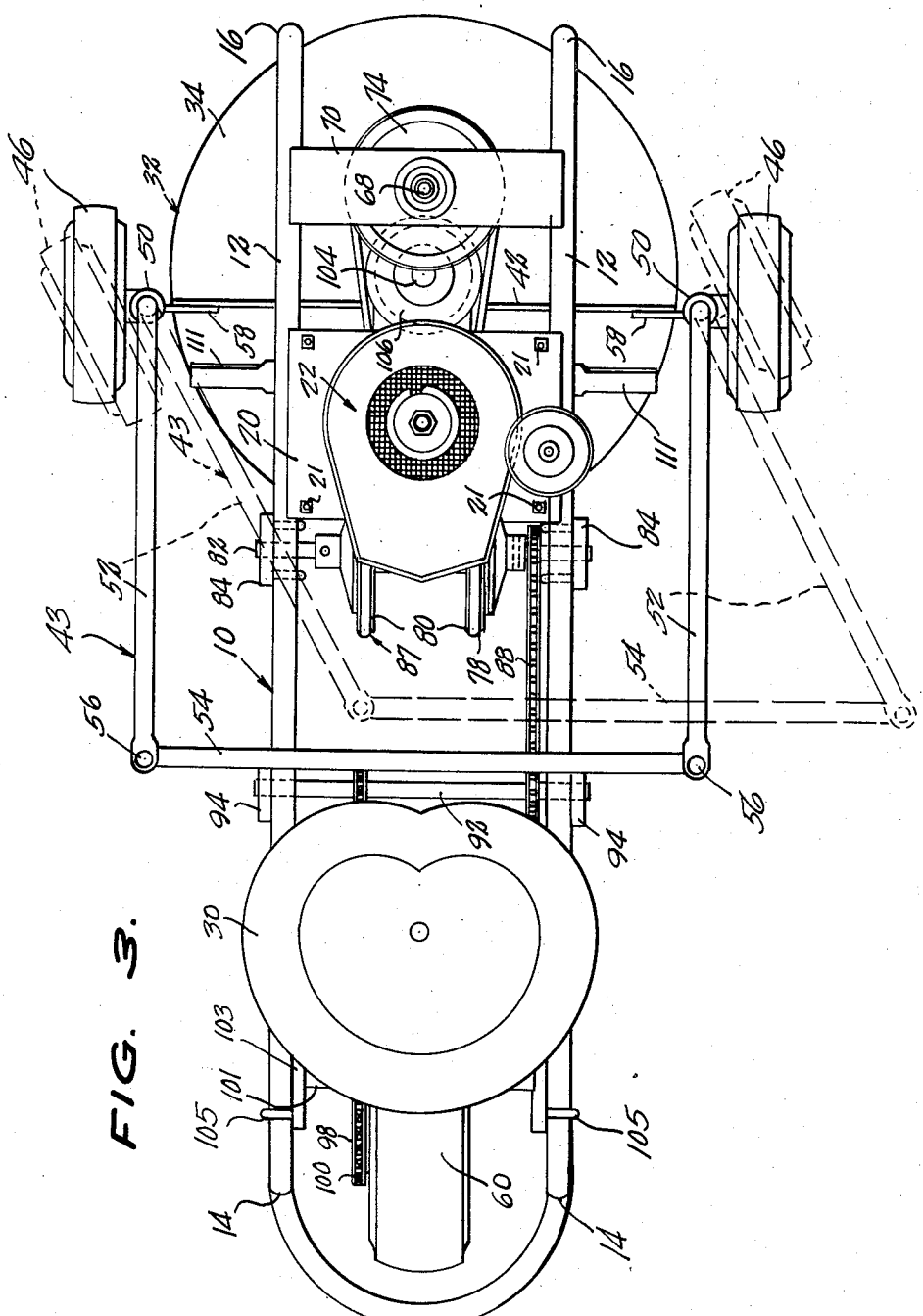
Figure 3 is a top plan view of the mower shown in Figure 2, the dotted lines showing the steering assembly in position for making a left turn.

Regardless of which arrangement is used, the stub shafts 44 are rigid with and extend laterally outwardly from the shafts 51, so as to turn the wheels, as for example to the full or dotted line positions of Figure 3, responsive to rotation of the shafts 51 in the bearing sleeves 48.

Shafts 51 at their upper ends are integral with rearwardly projecting steering bar extensions 52 and these are connected to a combination tie rod and handle bar 54 through the use of pivotal connections 56 (see Figure 3).

The tie rod, as will be apparent from Figure 3, is grasped as a handle bar by the rider. On movement of the tie rod in the direction of its length either to left or right, the bars 51 are rotated to turn the wheels while keeping the wheels parallel. Thus, member 54 is truly a tie rod, discharging the same functions as it would when extended between the wheels at a location elsewhere than as shown in the drawing.

Bracing the connections of the sleeves 48 to the plate 42 are triangular brace plates 58.

This completes the construction of the steering assembly, and as will be noted, the components thereof comprise the elements 44 through 58, and constitute a highly effective, yet simply designed steering mechanism readily operated by the seated rider.

A rear drive wheel has been designated at 60, and is of substantially greater diameter than the front wheels, being disposed medially between opposite sides of the device below the rider's seat.

Designated generally at 61 is a driving assembly, and this is adapted to transmit drive from the prime mover 22 both to the rear wheel and to the cutting blade.

The driving assembly is shown to particular advantage in Figures 2-5, and as will be noted from Figure 2, projecting downwardly from the engine 22 is the shaft 62 thereof, to which is connected for rotation in a horizontal plane a drive pulley 64 about which is trained a belt 66. Belt 66 extends forwardly, and extending vertically between the side frame members is a jackshaft 68, journalled at its upper and lower ends in bearing plates 70, 72 that are fixedly secured to and extend transversely of the intermediate portions of the side frame members and the side rails 18, respectively. Rotatable with shaft 68 is an idler pulley 74 larger in diameter than pulley 64, and also connected to shaft 68 for rotation therewith is a pulley 76 about which is trained a second belt 78.

Figure 4:
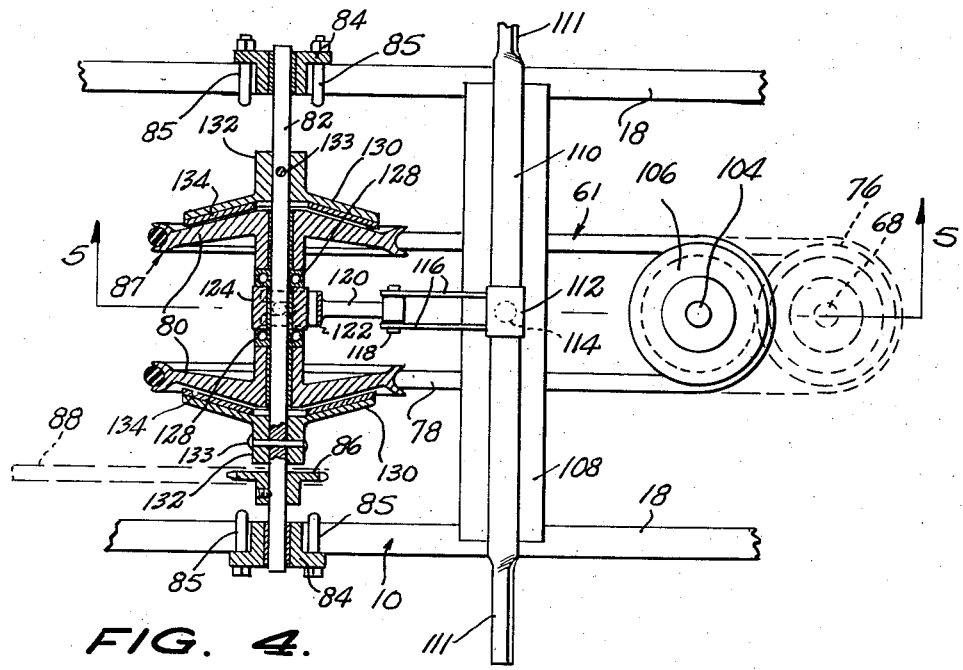
Figure 4 is an enlarged, horizontal sectional view substantially on line 4—4 of Figure 2, showing the clutching assembly.
Figure 5:
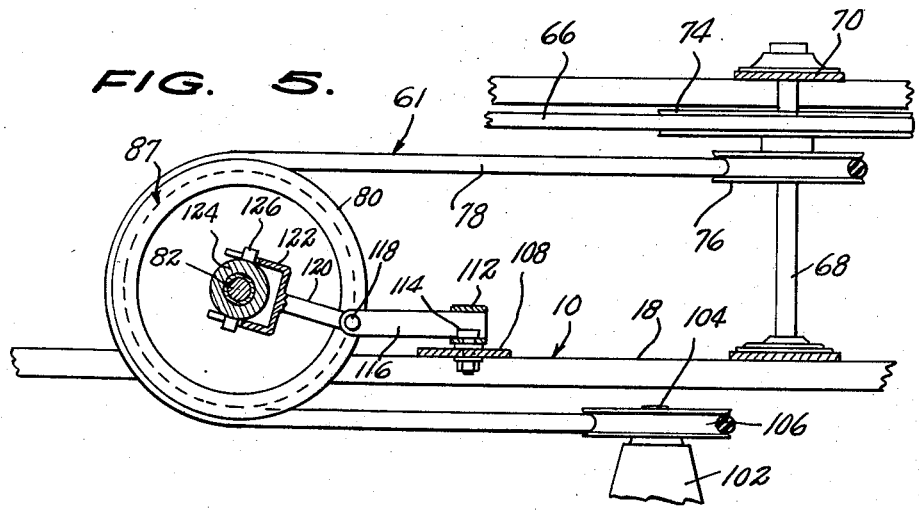
Figure 5 is a longitudinal sectional view substantially on line 5—5 of Figure 4.

Referring now to Figures 4 and 5, a pair of shallowly conical, confronting, opposite but identical drive clutch discs 80 is provided upon a transversely disposed driven shaft 82 journalled at its opposite ends in bearing plates 84 secured by C-bolts 85 (see Figures 2 and 4), that are secured to the respective side rails 18. The arrangement, of course, permits the propeller shaft 82 to be secured in a selected position of adjustment longitudinally of and extending transversely of the frame, and this arrangement is adapted to permit tensioning of the belt 78.

The drive discs 80 of the double clutch arrangement shown in Figure 4 are peripherally grooved for extension of the belt 78 thereabout. In this connection, the double clutch assembly included in the invention has been generally designated at 87 and includes additional components, which will be discussed in greater detail hereinafter. It is sufficient to note, at this point of the description, that when the clutch means 87 is engaged, rotation in a selected direction is transmitted to the propeller shaft 82.

Secured to shaft 82 for rotation therewith is a small drive sprocket 86, about which is trained a chain 88 (see Figure 2) driving a large diameter sprocket 90 that is connected to a jackshaft 92 for rotation therewith. Bearing plates 94 are connected between members 12 and rails 18 at the respective sides of the machine, and the shaft 92 is journaled at its ends in said plates 94. Also rotating with shaft 92 is a small sprocket 96 about which is trained a chain 98 trained also about a large driven sprocket 100, the sprocket 100 (see Figure 3) being connected to a rear wheel axle 101 journalled at its ends in bearing plates 103 secured by U-bolts 105 to the rear end portions of side rails 18. Connected to the axle for rotation therewith is the rear wheel 60.

In this way, a speed reducing drive linkage is provided between the prime mover and the rear wheel, and incorporated in said linkage is a clutch means generally designated 87. As will presently appear, clutch means 87 is adapted to transmit rotational movement to propeller shaft 82 in either direction, for moving the mower either forwardly or in reverse, as desired.

Still further, the clutch means is adapted to completely disengage the propeller shaft 82 from the portion of the drive assembly that extends from the prime mover to the propeller shaft.

The drive assembly 61 also drives the cutter blade, but the clutch assembly 87 is inoperative to disengage the blade from the prime mover. Of course, this is as it should be, since there is no need to disengage the blade from its driving-driven relationship with the prime mover, and further, there is no need for the blade to rotate other than in one direction.

In any event, referring to Figures 4 and 5, belt 78, after being trained about clutch discs 80, is extended forwardly, and projecting upwardly from housing 34, centrally thereof, is an upwardly tapering blade shaft housing 102 having therein a bearing in which is journalled a vertical or blade shaft 104, to which a driven pulley 106 is connected for rotation therewith. Belt 78 is trained about pulley 106 as shown in Figure 5.

Reverting now to the clutch mechanism 87, a shifting lever support plate 108 is fixedly secured at its opposite ends to the side rails 18, and overlying and extending longitudinally of plate 108 is a shifting lever 110, the ends of which are axially twisted to provide transversely inclined foot rests 111 projecting laterally outwardly from the frame at opposite sides thereof, in position to support the feet of a rider (see Figure 3).

Medially between the opposite ends of the shifting lever 110, there is provided a sleeve element 112, fixedly secured to the lever 110 and enclosing a headed pivot pin 114 extending through plate 108 to pivot the lever 110 on the plate for rocking movement about the axis defined by the pin.

Fixedly secured to the shifting lever and sleeve element 112 at opposite sides of pin 114 is a rearwardly extending yoke 116 having a pivotal connection at 118 to a shifter arm 120. The pivotal connection 118 permits relative swinging movement of arm 120 and yoke 116 only about a horizontal axis extending transversely of the frame. Therefore, whenever yoke 116 is swung to left or right from its neutral position shown in Figure 4, about the axis defined by the pin 114, the arm 120 will swing laterally therewith, thus to correspondingly shift to left or right a shifting collar yoke 122 embracing a shifting collar 124 formed at diametrically opposite locations with pins 126 pivotally engaged in slots of the respective arms of the yoke 122. Collar 124 abuts, at its opposite sides, ball bearings 128 which are disposed as spacers between collar 124 and confronting hubs of the clutch discs 80.

Disposed in close proximity to the outer or convex surfaces of the discs 80 are driven clutch discs 130, having hubs 132 pinned to the propeller shaft 82 as at 133.

Provided upon the inner surfaces of the driven clutch discs 130 are clutch facings 134, adapted to frictionally engage against the outer surfaces of the drive discs 80.

By reason of this arrangement, an operator seated upon the machine with his feet supported upon the foot rest 111 may exert a pressure in a forward direction against a selected foot rest. Thus, by way of example, pressure might be exerted against the foot rest 111 appearing at the bottom in Figure 4. This would rock lever 110 counterclockwise about pivot 114, swinging shifter collar yoke 122 downwardly in Figure 4, that is, in the direction of the foot rest against which pressure was exerted. One sees, thus, that by pressing forwardly against the right hand foot rest, collar 124 will be shifted along shaft 82 to the right, correspondingly shifting to the right the disc 80 which is to the right of the collar, that is, which is below the collar viewing the same as in Figure 4.

Due to this arrangement, that clutch disc 130 which is adjacent sprocket 86 would be engaged by the clutch disc 80 next to the same, and this would cause rotation of the propeller shaft 82 in the same direction as is rotating that disc 80 that has been shifted by the collar.

If the collar were shifted in the opposite direction, that is, upwardly in Figure 4 by exertion of pressure against the left hand foot rest, the other clutch disc 80 would be engaged with its adjacent driven clutch disc 130. Since said other clutch disc 80 rotates in an opposite direction from the first disc 80, this would cause rotation of the shaft 82 in an opposite direction. In this way, either forward or reverse movement of the machine is effected, responsive to depression of a selected foot rest.

Therefore, an exerting forward pressure with one foot rest to swing lever 110 in one direction, the machine will move forwardly. On pressing forwardly the other foot rest, to rock the lever in an opposite direction, the machine will go into reverse. When the lever is in its middle position, neither driven clutch disc 130 is engaged, and the prime mover is therefore disengaged from the drive wheel, so that the machine is in neutral and has no forward or rearward movement. The cutter blade will, however, be continuously rotated in one direction whether the machine is in reverse, forward drive, or neutral.

The arrangement provides a generally improved drive means for a mower of the character described, designed to permit manufacture of the mower at a relatively low cost, considering the marked versatility thereof. Still further, all parts are readily accessible for maintenance or repair. Still further, the mover is highly maneuverable, and the various components thereof are so incorporated in the construction as to facilitate, to a marked extent, relative adjustment of the positions of the parts.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a power mower having a cutter mounted on a vertical shaft, a driven pulley on said vertical shaft, an idler pulley spaced from said driven pulley, a pair of spaced drive clutch discs laterally spaced with respect to said driven and idler pulleys and movably mounted on a single driven shaft, a single belt trained over said driven and idler pulleys and over said drive clutch discs, a driven clutch disc spaced outwardly of and adjacent each of said drive clutch discs and each connected to said driven shaft for rotation therewith, and means operatively connected to said driven clutch discs for alternately engaging each of said drive clutch discs.

2. In a power mower having a cutter mounted on a vertical shaft, a driven pulley on said vertical shaft, an idler pulley spaced from said driven pulley, a pair of spaced drive clutch discs laterally spaced with respect to said driven and idler pulleys and movably mounted on a single driven shaft, a single belt trained over said driven and idler pulleys and over said drive clutch discs, a driven clutch disc spaced outwardly of and adjacent each of said drive clutch discs and each connected to said driven shaft for rotation therewith, a shifting collar on said single driven shaft between and spaced from said driven clutch discs, and a rock lever operatively connected to said collar for alternately engaging each of said driven clutch discs with the adjacent drive clutch disc.

3. In a power mower having a cutter mounted on a vertical shaft, a driven pulley on said vertical shaft, an idler pulley spaced from said driven pulley, a pair of spaced drive clutch discs laterally spaced with respect to said driven and idler pulleys and movably mounted on a single driven shaft, a single belt trained over said driven and idler pulleys and over said drive clutch discs, a driven clutch disc spaced outwardly of and adjacent each of said drive clutch discs and each connected to said driven shaft for rotation therewith, a ball bearing assembly on said single driven shaft inwardly of and adjacent each of said drive clutch discs, a shifting collar on said single driven shaft between and abutting said bearing assemblies, and a rock lever operatively connected to said collar for alternately engaging each of said driven clutch discs with the adjacent drive clutch discs.

References Cited in the file of this patent

UNITED STATES PATENTS

| | | |
|---|---|---|
| 1,361,875 | Knittel | Dec. 14, 1920 |
| 2,619,209 | Horn | Nov. 25, 1952 |
| 2,620,612 | De Eugenio | Dec. 9, 1952 |
| 2,729,834 | Emrick | Jan. 10, 1956 |
| 2,771,959 | Phelps | Nov. 27, 1956 |
| 2,795,914 | Smith | June 18, 1957 |